US011042290B2

(12) United States Patent
Hu et al.

(10) Patent No.: US 11,042,290 B2
(45) Date of Patent: Jun. 22, 2021

(54) TOUCH SCREEN TRACK RECOGNITION METHOD AND APPARATUS

(71) Applicants: Beijing Kingsoft Office Software, Inc., Beijing (CN); Zhuhai Kingsoft Office Software Co., Ltd, Zhuhai (CN); Guangzhou Kingsoft Mobile Technology Co., Ltd, Guangzhou (CN)

(72) Inventors: Juan Hu, Zhuhai (CN); Lanhua Huang, Zhuhai (CN)

(73) Assignees: BEIJING KINGSOFT OFFICE SOFTWARE, INC., Beijing (CN); ZHUHAI KINGSOFT OFFICE SOFTWARE CO., LTD, Zhuhai (CN); GUANGZHOU KINGSOFT MOBILE TECHNOLOGY CO., LTD, Guangzhou (CN)

( * ) Notice: Subject to any disclaimer, the term of this patent is extended or adjusted under 35 U.S.C. 154(b) by 128 days.

(21) Appl. No.: 16/096,656

(22) PCT Filed: Aug. 30, 2016

(86) PCT No.: PCT/CN2016/097316
§ 371 (c)(1),
(2) Date: Oct. 25, 2018

(87) PCT Pub. No.: WO2017/185575
PCT Pub. Date: Nov. 2, 2017

(65) Prior Publication Data
US 2020/0210059 A1  Jul. 2, 2020

(30) Foreign Application Priority Data
Apr. 28, 2016  (CN) .......................... 201610281833.9

(51) Int. Cl.
*G06F 3/0488*  (2013.01)

(52) U.S. Cl.
CPC .................... *G06F 3/04883* (2013.01); *G06F 2203/04808* (2013.01)

(58) Field of Classification Search
CPC ................... G06F 3/04883; G06F 2203/04808
See application file for complete search history.

(56) References Cited

U.S. PATENT DOCUMENTS

2013/0290911 A1* 10/2013 Praphul .................. G06F 3/017
715/863
2014/0028605 A1   1/2014 Luo et al.
(Continued)

FOREIGN PATENT DOCUMENTS

CN      101882042 A      11/2010
CN      102063236 A       5/2011
(Continued)

OTHER PUBLICATIONS

Office Action for Japanese Patent Application No. 2018-556431 dated Jan. 14, 2020; 4 pgs.

*Primary Examiner* — Roland J Casillas
(74) *Attorney, Agent, or Firm* — Umberg Zipser LLP

(57) ABSTRACT

A method and apparatus for identifying a trajectory on a touch screen solves many limitations that the stylus and the gesture operation currently subjected to in the operation state of the touch screen. For example, due to the chaotic operation caused by the stylus and the gesture operation, it is difficult to distinguish the actual operation attributes such that the operation is too cumbersome and not straightforward, resulting in the technical problem of low user experience. The method for identifying a trajectory on a touch screen includes: detecting a touch operation instruction triggered on the touch screen (101); and then determining a type of the touch operation instruction (102); if the type of the touch operation instruction is a stylus-triggered instruction, performing a corresponding processing according to (Continued)

the acquired trajectory of stylus (103), and if the type of the touch operation instruction is a gesture-triggered instruction, performing a corresponding processing according to the acquired trajectory of gesture (104).

6 Claims, 4 Drawing Sheets

(56) References Cited

U.S. PATENT DOCUMENTS

2015/0145820 A1\* 5/2015 Huang ................ G06F 3/04883
                                                                    345/174
2015/0261378 A1     9/2015 Lee et al.

FOREIGN PATENT DOCUMENTS

| CN | 102707861 A | 10/2012 |
| CN | 103207718 A | 7/2013 |
| CN | 103713786 A | 4/2014 |
| CN | 104915136 A | 9/2015 |
| JP | 2011143557 A | 7/2011 |
| JP | 2014078234 A | 5/2014 |
| JP | 2015135553 A | 7/2015 |

\* cited by examiner

TOUCH SCREEN TRACK RECOGNITION METHOD AND APPARATUS

The present application claims the priority to a Chinese Patent Application No. 201610281833.9, filed with the China National Intellectual Property Administration, on Apr. 28, 2016 and entitled "TOUCH SCREEN TRACK RECOGNITION METHOD AND APPARATUS", which is incorporated herein by reference in its entirety.

TECHNICAL FIELD

The present application relates to the field of touch screen operation technology, and in particular, to a method and apparatus for identifying a trajectory on a touch screen.

BACKGROUND

In recent years, mobile devices have become more and more popular, and the demand for writing/drawing on mobile devices is increasing. Since a stylus can well meet the needs of writing and drawing on mobile devices, the stylus has been widely used.

Generally, the operation result of the stylus is consistent with the operation result of the gesture operation, but the stylus and the gesture operation are subject to many limitations in the operation state of the touch screen. For example, due to the chaotic operation caused by the stylus and the gesture operation, it is difficult to distinguish the actual operation attributes such that the operation is too cumbersome and not straightforward, resulting in the technical problem of low user experience.

SUMMARY

A method and apparatus for identifying a trajectory on a touch screen provided by embodiments of the present application solves many limitations in the operations by a stylus and a gesture currently existing in the operation state of the touch screen can be solved, such as the technical problem of low user experience caused by indistinguishable, complex and indirect operations on the touch screen due to mix-up operations of the stylus and the gesture.

A method for identifying a trajectory on a touch screen provided by an embodiment of the present application includes:

detecting a touch operation instruction triggered on the touch screen;

determining a type of the touch operation instruction; if the touch operation instruction is a stylus-triggered instruction, performing a corresponding processing according to an acquired trajectory of the stylus, and if the touch operation instruction is a gesture-triggered instruction, performing a corresponding processing according to an acquired trajectory of the gesture.

Optionally, detecting a touch operation instruction triggered on the touch screen specifically includes:

in an ink state, acquiring a trigger mode returned by the touch screen;

automatically matching the trigger mode with an input source and determining a corresponding touch operation instruction.

Optionally, automatically matching the trigger mode with an input source and determining a corresponding touch operation instruction specifically includes:

automatically matching the trigger mode with an encapsulated api corresponding to an input source and determining a touch operation instruction corresponding to the encapsulated api.

Optionally, performing a corresponding processing according to an acquired trajectory of the gesture specifically includes:

performing a corresponding processing of gesture according to an acquired trajectory of the gesture of a single-finger operation or a multi-finger operation;

wherein, the processing of gesture includes: zooming an interface, and/or scrolling an interface, and/or selecting text content, and/or filling an area swept by a gesture, and/or cutting/copying an area swept by a gesture.

Optionally, performing a corresponding processing according to an acquired trajectory of the stylus specifically includes:

performing a corresponding processing of stylus according to an acquired trajectory of the stylus;

wherein, the processing of stylus includes: an ink drawing processing, and/or a laser stylus processing, and/or a regular image/object drawing processing, and/or an eraser processing.

Optionally, the method for identifying a trajectory on a touch screen further includes:

when it is determined that the touch operation instruction includes both of a stylus-triggered instruction and a gesture-triggered instruction, performing a corresponding processing in priority order according to a preset priority;

or determining whether the touch operation instruction is a special case based on the preset priority, and if it is determined to be a special case, readjusting the priority order;

or simultaneously performing operations corresponding to a stylus-triggered instruction and a gesture-triggered instruction.

An apparatus for identifying a trajectory on a touch screen provided by an embodiment of the present application includes:

a detecting unit, configured for detecting a touch operation instruction triggered on the touch screen;

a determination unit, configured for determining a type of the touch operation instruction; if the touch operation instruction is a stylus-triggered instruction, triggering a stylus processing unit, and if the touch operation instruction is a gesture-triggered instruction, triggering a gesture processing unit;

the stylus processing unit is configured for performing a corresponding processing according to an acquired trajectory of the stylus;

the gesture processing unit is configured for performing a corresponding processing according to an acquired trajectory of the gesture.

Optionally, the detecting unit specifically includes:

a returning subunit, configured for, in an ink state, acquiring a trigger mode returned by the touch screen;

a determination subunit, configured for automatically matching the trigger mode with an input source and determining a corresponding touch operation instruction.

Optionally, the determination subunit is configured for automatically matching the trigger mode with an encapsulated api corresponding to an input source and determining a touch operation instruction corresponding to the encapsulated api.

Optionally, the gesture processing unit is configured for performing a corresponding processing of gesture according to an acquired trajectory of the gesture of a single-finger operation or a multi-finger operation;

wherein, the processing of gesture includes: zooming an interface, and/or scrolling an interface, and/or selecting text content, and/or filling an area swept by a gesture, and/or cutting/copying an area swept by a gesture.

Optionally, the stylus processing unit is configured for performing a corresponding processing of stylus according to an acquired trajectory of the stylus;

wherein, the processing of stylus includes: an ink drawing processing, and/or a laser stylus processing, and/or a regular image/object drawing processing, and/or an eraser processing.

Optionally, the apparatus for identifying a trajectory on a touch screen further includes:

a simultaneous processing unit, configured for, when the determination unit determines that the touch operation instruction includes both of a stylus-triggered instruction and a gesture-triggered instruction, performing a corresponding processing in priority order according to a preset priority, or determining whether the touch operation instruction is a special case based on the preset priority, and if it is determined to be a special case, readjusting the priority order, or simultaneously performing operations corresponding to a stylus-triggered instruction and a gesture-triggered instruction.

An electronic device provided by an embodiment of the present application includes:

a processor, a memory, communication interfaces and a communication bus; wherein the processor, the memory, and the communication interfaces are connected and communicate with each other via the communication bus;

the memory stores executable program codes;

the processor executes a program corresponding to the executable program codes by reading the executable program codes stored in the memory to implement the method for identifying a trajectory on a touch screen described in the present application.

An embodiment of the present application provides a storage medium, wherein, the storage medium is configured for storing an executable program code, and the executable program code is configured for, when being executed, implementing the method for identifying a trajectory on a touch screen described in the present application.

An embodiment of the present application provides an application program, wherein, the application program is configured for, when being executed, implementing the method for identifying a trajectory on a touch screen described in the present application.

As can be seen from the above technical solutions, the embodiments of the present application have the following advantages:

the embodiments of the present application provide a method and apparatus for identifying a trajectory on a touch screen; wherein, the method for identifying a trajectory on a touch screen includes: detecting a touch operation instruction triggered on the touch screen; and then determining a type of the touch operation instruction; if the touch operation instruction is a stylus-triggered instruction, performing a corresponding processing according to an acquired trajectory of the stylus, and if the touch operation instruction is a gesture-triggered instruction, performing a corresponding processing according to an acquired trajectory of the gesture. In this embodiment, the type of the touch operation instruction is determined, and if the type of the touch operation instruction is a stylus-triggered instruction, a corresponding processing is performed according to the acquired trajectory of stylus, and if the type of the touch operation instruction is a gesture-triggered instruction, a corresponding processing is performed according to the acquired trajectory of gesture, many limitations in the operations by a stylus and gesture currently existing in the operation state of the touch screen can be solved, such as the technical problem of low user experience caused by indistinguishable, complex and indirect operations on the touch screen due to mix-up operations of the stylus and the gesture.

BRIEF DESCRIPTION OF THE DRAWINGS

In order to more clearly describe the technical solutions in the embodiments of the present application and the prior art, drawings that need to be used in the embodiments and the prior art will be briefly described below. Obviously, the drawings described below are for only some embodiments of the present application; those skilled in the art can also obtain other drawings based on these drawings without any creative efforts.

DETAILED DESCRIPTION

In order to enable those skilled in the art to better understand the technical solutions in the embodiments of the present application, the technical solutions in the embodiments of the present application will be described clearly and completely below in combination with the accompanying drawings of the embodiments of the present application. Obviously, the embodiments described are merely a part of the embodiments of the present application, not all of the embodiments. All other embodiments obtained by those skilled in the art based on the embodiments of the present application without creative efforts shall fall within the protection scope of the application.

Figure 1:
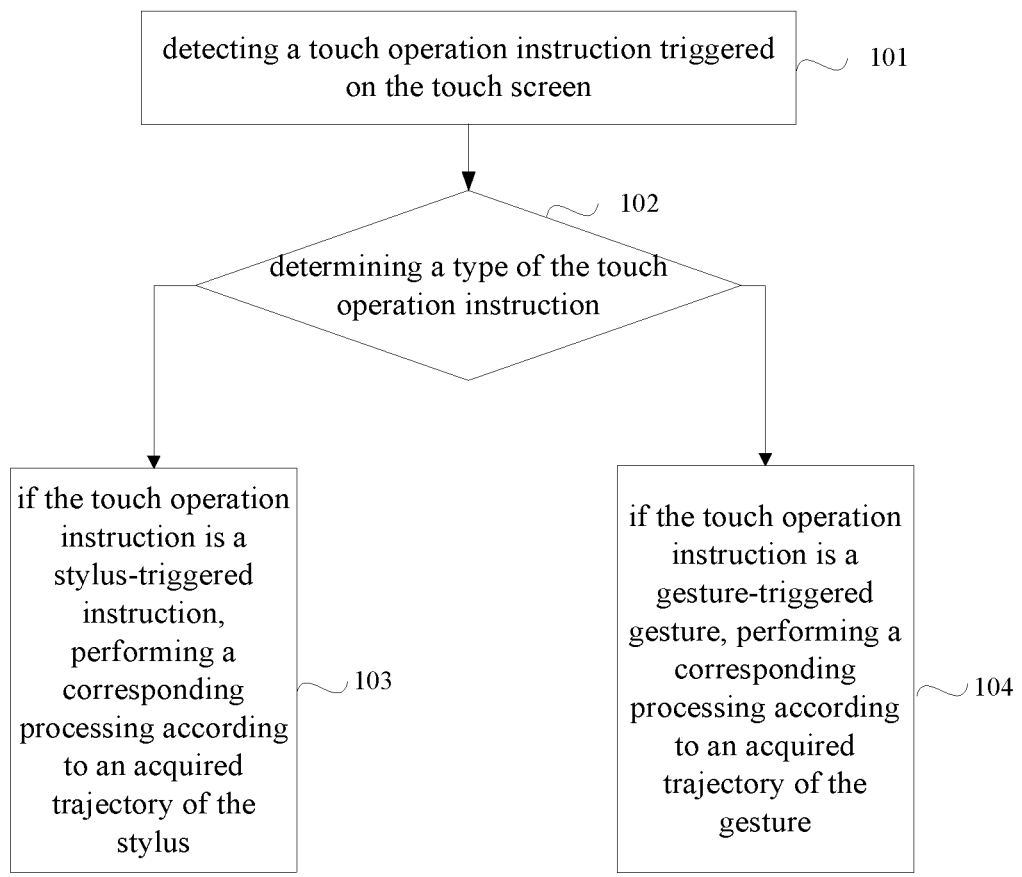
FIG. 1 is a schematic flowchart diagram of an embodiment of a method for identifying a trajectory on a touch screen provided by embodiments of the present application.

Referring to FIG. 1, an embodiment of a method for identifying a trajectory on a touch screen provided by embodiments of the present application includes the following steps.

101, detecting a touch operation instruction triggered on the touch screen.

In this embodiment, when it is required to determine a touch of a stylus or a gesture in an ink state, it is first necessary to detect the touch operation instruction triggered on the touch screen.

102, determining a type of the touch operation instruction; if the touch operation instruction is a stylus-triggered instruction, performing the step 103, and if the touch operation instruction is a gesture-triggered instruction, performing the step 104.

After detecting a touch operation instruction triggered on the touch screen, it is required to determine the type of the touch operation instruction. If the touch operation instruction is a stylus-triggered instruction, the step 103 is performed, and if the touch operation instruction is a gesture-triggered instruction, the step 104 is performed.

103, performing a corresponding processing according to an acquired trajectory of the stylus.

When it is determined that the touch operation instruction is a stylus-triggered instruction, a corresponding processing is performed according to the acquired trajectory of the stylus.

104, performing a corresponding processing according to an acquired trajectory of the gesture.

When it is determined that the touch operation instruction is a gesture-triggered instruction, a corresponding processing is performed according to an acquired trajectory of the gesture.

In this embodiment, the type of the touch operation instruction is determined, and if the touch operation instruction is a stylus-triggered instruction, a corresponding processing is performed according to the acquired trajectory of stylus, and if the touch operation instruction is a gesture-triggered instruction, a corresponding processing is performed according to the acquired trajectory of gesture, many limitations in the operations by a stylus and gesture currently existing in the operation state of the touch screen can be solved, such as the technical problem of low user experience caused by indistinguishable, complex and indirect operations on the touch screen due to mix-up operations of the stylus and the gesture.

Figure 2:
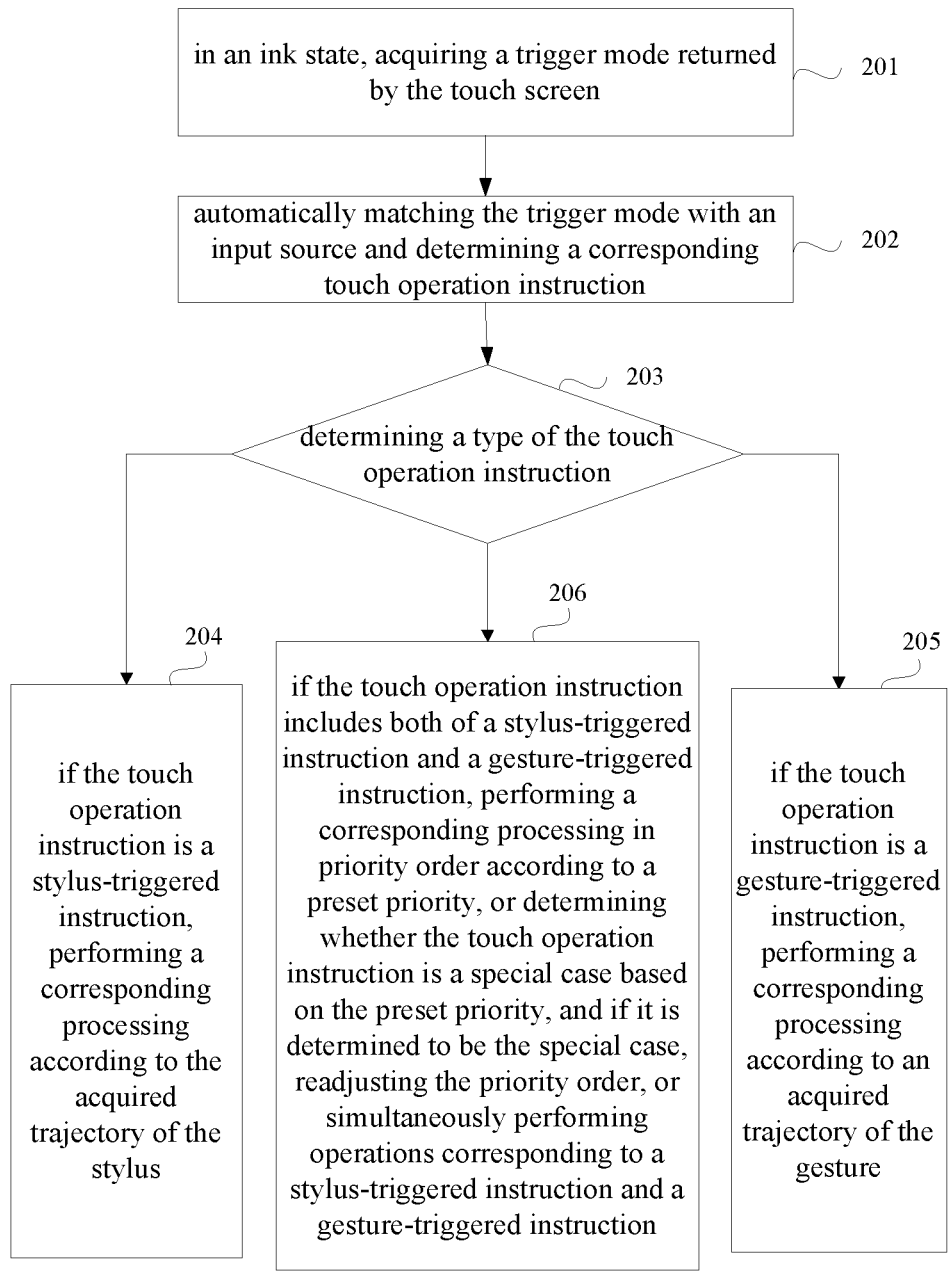
FIG. 2 is a schematic flowchart diagram of another embodiment of a method for identifying a trajectory on a touch screen provided by embodiments of the present application.

The process of the method for identifying a trajectory on a touch screen is described in detail above, and the additional processes will be described in detail below. Referring to FIG. 2, another embodiment of the method for identifying a trajectory on a touch screen provided by embodiments of the present application includes the following steps.

201, acquiring a trigger mode returned by the touch screen.

In this embodiment, when it is required to determine a touch of a stylus or a gesture, the trigger mode returned by the touch screen is first acquired.

202, automatically matching the trigger mode with an input source and determining a corresponding touch operation instruction.

After acquiring a trigger mode returned by the touch screen, it is required to automatically match the trigger mode with an input source and determine a corresponding touch operation instruction.

The automatically matching an input source to the trigger mode and determining a corresponding touch operation instruction may include automatically matching the trigger mode with an encapsulated api corresponding to an input source and determining a corresponding touch operation instruction according to the encapsulated api. For example, the ios 9 system has an attribute type that can be used to distinguish between a finger and a stylus. If the input source is different, the api gestures encapsulated in the system would be different. For example, when receiving a gesture, the UITouch gesture source has encapsulated type, which is a well-known technique in the art and will not be described in detail.

203, determining the type of the touch operation instruction; if the touch operation instruction is a stylus-triggered instruction, performing step 204, if the touch operation instruction is a gesture-triggered instruction, performing step 205, and if the touch operation instruction includes both of a stylus-triggered instruction and a gesture-triggered instruction, performing step 206.

After automatically matching the trigger mode with an input source and determining a corresponding touch operation instruction, it is required to determine the type of the touch operation instruction. If the touch operation instruction is the stylus-triggered instruction, the step 204 is performed, if the touch operation instruction is the gesture-triggered instruction, the step 205 is performed, and if the touch operation instruction includes both of a stylus-triggered instruction and a gesture-triggered instruction, the step 206 is performed.

204, performing a corresponding processing according to the acquired trajectory of the stylus.

When it is determined that the touch operation instruction is a stylus-triggered instruction, a corresponding processing is performed according to an acquired trajectory of the stylus.

It should be noted that the processing of a stylus includes: an ink drawing processing, and/or a laser stylus processing, and/or a regular image/object drawing processing, and/or an eraser processing.

205, performing a corresponding processing according to an acquired trajectory of the gesture.

When it is determined that the touch operation instruction is a gesture-triggered instruction, a corresponding processing is performed according to the acquired trajectory of the gesture.

It should be noted that, the performing a corresponding processing according to an acquired trajectory of the gesture may specifically include performing a corresponding processing of gesture according to the acquired trajectory of the gesture of a single-finger operation or a multi-finger operation. Wherein, the processing of gesture includes: zooming an interface, and/or scrolling an interface, and/or selecting text content, and/or filling an area swept by a gesture, and/or cutting/copying an area swept by a gesture. Actually, the effect of the processing of gesture is not limited.

206, performing a corresponding processing in priority order according to a preset priority, or determining whether the touch operation instruction is a special case based on the preset priority, and if it is determined to be the special case, readjusting the priority order, or simultaneously performing operations corresponding to a stylus-triggered instruction and a gesture-triggered instruction.

When it is determined that the touch operation instruction includes both of a stylus-triggered instruction and a gesture-triggered instruction, a prioritized order processing corresponding to a preset priority is performed, or whether the touch operation instruction is a special case is determined based on the preset priority, and if it is determined to be the special case, the prioritized order is readjusted, or operations corresponding to the stylus-triggered instruction and the gesture-triggered instruction are simultaneously performed.

The above "readjusting" may be performed in the same scene. For example, usually, in a setting of the preset priority, if the hand touches the screen first, the screen would first respond to the hand, and if the stylus touches the screen first, the screen would first respond to the stylus. But a special determination can be added, such that if the contact area of the hand is too large, it will not respond to the hand.

It should be noted that when the stylus and the hand touches the screen at the same time, priority decisions may be made through some identifications. For example, if the contact area of the hand is too large or meets certain characteristics, it can be determined that the user is in the state of holding the stylus, and the palm or the finger is support the screen to draw. In this case, the contact behavior of the hand is automatically ignored. When the stylus and the hand touches the screen at the same time, the subsequent processing is not necessarily mutually exclusive. If the two actions do not conflict, the two actions of the hand and the stylus may be performed at the same time. The action of the finger may also be extended to any other action. For example, the single-finger slip may be defined as the erase behavior. After drawing an ink with the stylus, and the ink content in the track of the finger movement may be erased when the finger slips at the ink position. Further, the stylus's behavior is not necessarily only to draw handwriting, for example, can be defined as drawing a regular rectangle, circle, etc., and even using the stylus as an eraser.

It should be noted that the above preset priority may be that the stylus operation corresponding to the stylus-triggered instruction is performed first, and then the gesture operation corresponding to the gesture-triggered instruction is performed, or the processing is reversed, which will not be described in detail. The above trajectory of gesture may be a multi-finger, single-finger operation, and is not specifically limited herein.

Figure 5:
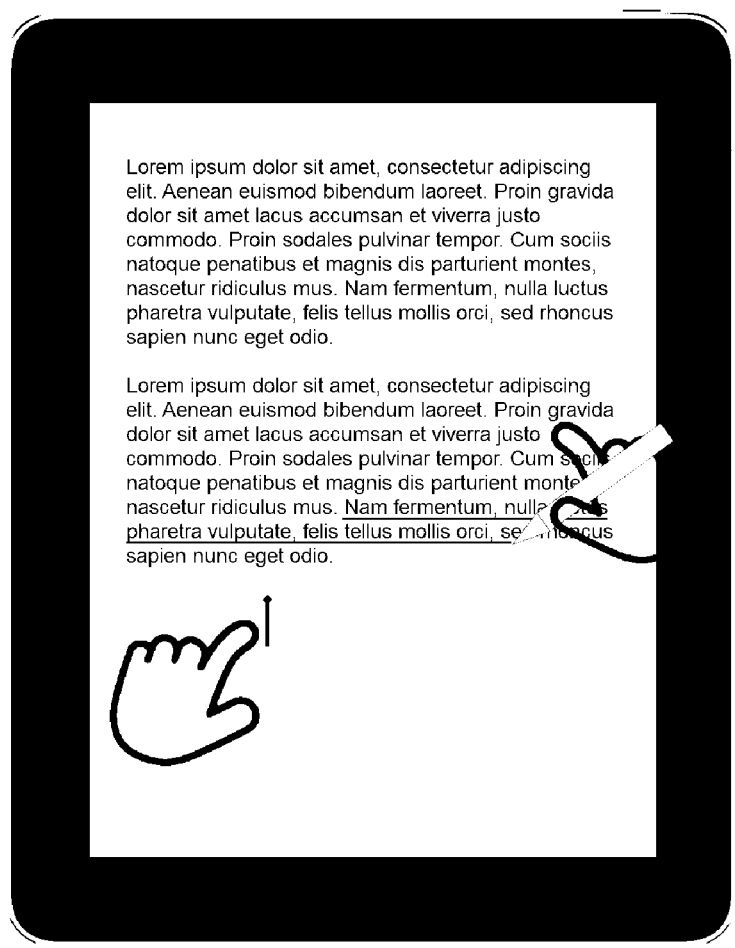
FIG. 5 is a schematic diagram of an application example of FIG. 2.

FIG. 5 shows distinguishing between the operations of stylus and gesture in the same interface, that is, responding to the operation of stylus upon using the stylus, that the result of the operation is to draw a handwriting effect, and, responding to the operation of gesture upon using the finger, such as scrolling the interface, zooming the interface, selecting text.

In this embodiment, the type of the touch operation instruction is determined, and if the touch operation instruction is a stylus-triggered instruction, a corresponding processing is performed according to the acquired trajectory of stylus, and if the touch operation instruction is a gesture-triggered instruction, a corresponding processing is performed according to the acquired trajectory of gesture, many limitations in the operations by a stylus and gesture currently existing in the operation state of the touch screen can be solved, such as the technical problem of low user experience caused by indistinguishable, complex and indirect operations on the touch screen due to mix-up operations of the stylus and the gesture. At the same time, by distinguishing between the stylus and the gesture operation, different operation feedbacks are given to the stylus and the gesture, such that the user can complete the operation task more conveniently and quickly without switching the state frequently, and distinguish the purpose of these two actions, writing ink and operating interface, by distinguishing between the stylus and the gesture. The effect achieved is that the interface may also be operated by gestures during the marking process by using the stylus, such as scrolling and zooming the interface, such that the user can mark while browsing, to help the user complete the marking process conveniently and quickly.

And in practical applications, if entering the specific ink state, it is possible to draw or write directly by using the stylus. But ordinary finger sweeping is also to draw ink, usually in this case, the existing solution is to support complex gestures, for example, the page may be sided by using two fingers at this time (It is difficult for users to discover and learn this gesture). But this processing is subject to many limitations, wherein, mainly the most direct single-finger sliding cannot directly scroll the page and single-finger can also not select the file element.

Further, by distinguishing between a trajectory of a stylus and a trajectory of a gesture, the drawing behavior is clearly distinguished from other behaviors, and more possibilities may be provided in the actual design, such as the user drawing the ink by the stylus or scrolling the page content by single-finger.

Figure 3:
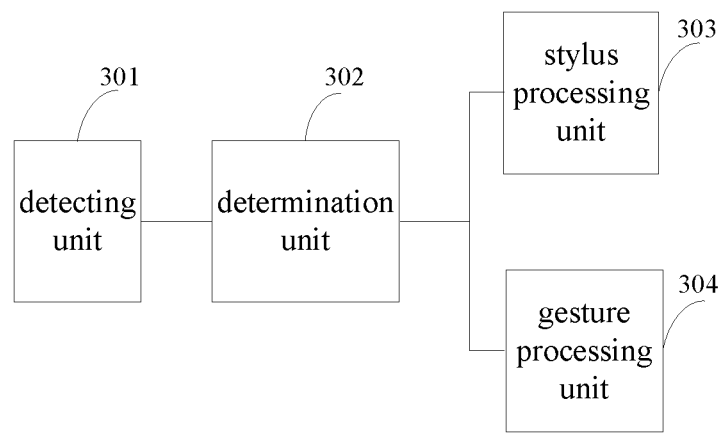
FIG. 3 is a structural schematic diagram of an embodiment of an apparatus for identifying a trajectory on a touch screen provided by embodiments of the present application.

Referring to FIG. 3, an embodiment of an apparatus for identifying a trajectory on a touch screen provided by embodiments of the present application includes:

a detecting unit 301, configured for detecting a touch operation instruction triggered on the touch screen;

a determination unit 302, configured for determining a type of the touch operation instruction; if the touch operation instruction is a stylus-triggered instruction, triggering a stylus processing unit 303, and if the touch operation instruction is a gesture-triggered instruction, triggering a gesture processing unit 304;

the stylus processing unit 303 is configured for performing a corresponding processing according to an acquired trajectory of the stylus;

the gesture processing unit 304 is configured for performing a corresponding processing according to an acquired trajectory of the gesture.

In this embodiment, the type of the touch operation instruction is determined by the determination unit 302; if the touch operation instruction is a stylus-triggered instruction, a corresponding processing is performed by the stylus processing unit 303 according to the acquired trajectory of stylus, and if the touch operation instruction is a gesture-triggered instruction, a corresponding processing is performed by the gesture processing unit 304 according to the acquired trajectory of gesture, many limitations in the operations by a stylus and gesture currently existing in the operation state of the touch screen can be solved, such as the technical problem of low user experience caused by indistinguishable, complex and indirect operations on the touch screen due to mix-up operations of the stylus and the gesture.

Figure 4:
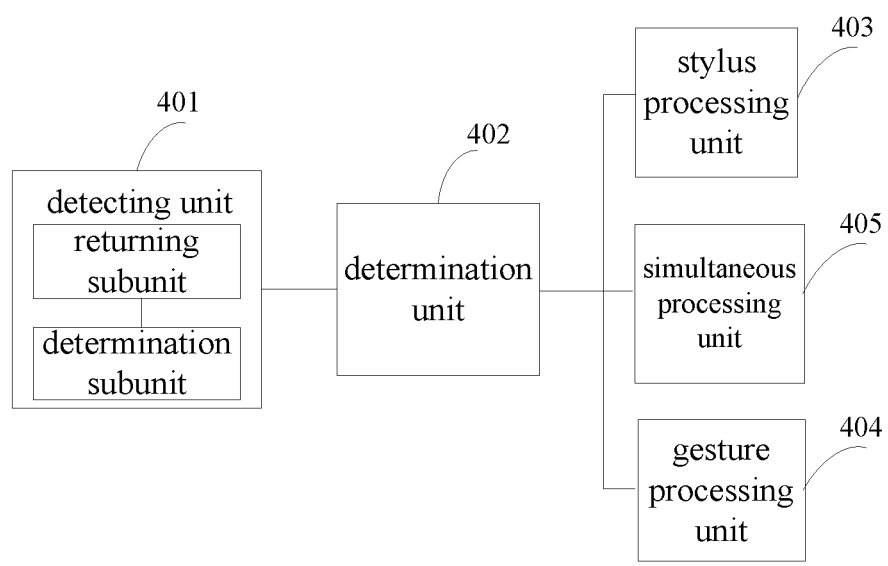
FIG. 4 is a structural schematic diagram of another embodiment of an apparatus for identifying a trajectory on a touch screen provided by embodiments of the present application.

Various units of the apparatus for identifying a trajectory on a touch screen is described in detail above, and the additional units will be described in detail below. Referring to FIG. 4, another embodiment of the apparatus for identifying a trajectory on a touch screen provided in embodiments of the present application includes:

a detecting unit 401, configured for detecting a touch operation instruction on the touch screen triggered on the touch screen; wherein, the detecting unit 401 specifically includes:

a returning subunit 4011, configured for acquiring a trigger mode returned by the touch screen;

a determination subunit 4012, configured for automatically matching the trigger mode with an input source and determining a corresponding touch operation instruction; wherein, the determination subunit 4012 is specifically configured for automatically matching the trigger mode with an encapsulated api corresponding to an input source and determining a corresponding touch operation instruction according to the encapsulated api;

a determination unit 402, configured for determining a type of the touch operation instruction; if the touch operation instruction is a stylus-triggered instruction, triggering a stylus processing unit 403, and if the touch operation instruction is a gesture-triggered instruction, triggering a gesture processing unit 404;

the stylus processing unit 403, configured for performing a corresponding processing according to an acquired trajectory of the stylus; wherein, the stylus processing unit is specifically configured for performing a corresponding processing of a stylus according to the acquired trajectory of the stylus;

wherein, the processing of a stylus includes: an ink drawing processing, and/or a laser stylus processing, and/or a regular image/object drawing processing, and/or an eraser processing;

the gesture processing unit 404, configured for performing a corresponding processing according to an acquired trajectory of the gesture; wherein, the gesture processing unit 404 is specifically configured for performing a corresponding processing of a gesture according to an acquired trajectory of the gesture of a single-finger operation or a multi-finger operation;

wherein, the processing of gesture includes: zooming an interface, and/or scrolling an interface, and/or selecting text content, and/or filling an area swept by a gesture, and/or cutting/copying an area swept by a gesture;

a simultaneous processing unit 405, configured for, when the determination unit 402 determines that the touch operation instruction includes both of a stylus-triggered instruction and a gesture-triggered instruction, performing a corresponding processing in priority order according to a preset priority, or determining whether the touch operation instruction is a special case based on the preset priority, and if it is determined to be the special case, readjusting the priority order, or simultaneously performing operations corresponding to the stylus-triggered instruction and the gesture-triggered instruction.

In this embodiment, the type of the touch operation instruction is determined by the determination unit 402; if the touch operation instruction is a stylus-triggered instruction, a corresponding processing is performed by the stylus processing unit 403 according to the acquired trajectory of stylus, and if the touch operation instruction is a gesture-triggered instruction, a corresponding processing is performed by the gesture processing unit 404 according to the acquired trajectory of gesture, many limitations in the operations by a stylus and gesture currently existing in the operation state of the touch screen can be solved, such as the technical problem of low user experience caused by indistinguishable, complex and indirect operations on the touch screen due to mix-up operations of the stylus and the gesture. At the same time, by distinguishing between the stylus and the gesture operation, different operation feedbacks are given to the stylus and the gesture, such that the user can complete the operation task more conveniently and quickly without switching the state frequently, and distinguish the purpose of these two actions, writing ink and operating interface, by distinguishing between the stylus and the gesture. The effect achieved is that the interface may also be operated by gestures during the marking process by using the stylus, such as scrolling and zooming the interface, such that the user can mark while browsing, to help the user complete the marking process conveniently and quickly.

Correspondingly, an embodiment of the present application further provides an electronic device, which may include:

a processor, a memory, communication interfaces and a communication bus; wherein, the processor, the memory, and the communication interfaces are connected and communicate with each other via the communication bus;

the memory stores executable program codes;

the processor executes a program corresponding to the executable program codes by reading the executable program codes stored in the memory to implement the method for identifying a trajectory on a touch screen provided by the present application when being executed.

In this embodiment, the type of the touch operation instruction is determined, and if the touch operation instruction is a stylus-triggered instruction, a corresponding processing is performed according to the acquired trajectory of stylus, and if the touch operation instruction is a gesture-triggered instruction, a corresponding processing is performed according to the acquired trajectory of gesture, many limitations in the operations by a stylus and gesture currently existing in the operation state of the touch screen can be solved, such as the technical problem of low user experience caused by indistinguishable, complex and indirect operations on the touch screen due to mix-up operations of the stylus and the gesture.

Correspondingly, an embodiment of the present application further provides a storage medium, wherein the storage medium is used for storing executable program codes, and the executable program codes are configured for, when being executed, implementing the method for identifying a trajectory on a touch screen provided by the present application.

In this embodiment, the type of the touch operation instruction is determined, and if the touch operation instruction is a stylus-triggered instruction, a corresponding processing is performed according to the acquired trajectory of stylus, and if the touch operation instruction is a gesture-triggered instruction, a corresponding processing is performed according to the acquired trajectory of gesture, many limitations in the operations by a stylus and gesture currently existing in the operation state of the touch screen can be solved, such as the technical problem of low user experience caused by indistinguishable, complex and indirect operations on the touch screen due to mix-up operations of the stylus and the gesture.

Correspondingly, an embodiment of the present application further provides an application program, wherein, the application program is configured for, when being executed, implementing the method for identifying a trajectory on a touch screen provided by the present application.

In this embodiment, by determining the type of the touch operation instruction, if the touch operation instruction is a stylus-triggered instruction, a corresponding processing is performed according to the acquired trajectory of stylus, and if of the touch operation instruction is a gesture-triggered instruction, a corresponding processing is performed according to the acquired trajectory of gesture, so as to solve many limitations that the stylus and the gesture operation currently subjected to in the operation state of the touch screen. For example, due to the chaotic operation caused by the stylus and the gesture operation, it is difficult to distinguish the actual operation attributes such that the operation is too cumbersome and not straightforward, resulting in the technical problem of low user experience.

The embodiments of an apparatus/an electronic device/a storage medium/an application program are described briefly since they are substantially similar to the embodiment of the method. The related contents can refer to the description of the embodiments of the method.

It should be noted that the relationship terms used herein, such as "first", "second" and the like are only used to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that is not specifically listed or the elements intrinsic to these processes, methods, articles, or devices. Without further limitations, elements defined by the wording "comprise(s) a/an . . . " do not exclude additional identical elements in the processes, methods, articles, or devices that includes the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by those with ordinary skills in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferred embodiments of the present application, and are not intended to limit the scope of protection of the present application. Any modifications, alternatives, improvements, or the like within the spirit and principle of the present application shall be included in the scope of protection of the present application.

The invention claimed is:

1. A method for identifying a trajectory on a touch screen, comprising:
   detecting a touch operation instruction triggered on the touch screen;
   determining a type of the touch operation instruction; if the touch operation instruction is a stylus-triggered instruction, performing a corresponding processing according to an acquired trajectory of the stylus, and if the touch operation instruction is a gesture-triggered instruction, performing a corresponding processing according to an acquired trajectory of the gesture;
   when it is determined that the touch operation instruction includes both of a stylus-triggered instruction and a gesture-triggered instruction, and if it is determined that a processing corresponding to the stylus-triggered instruction and a processing corresponding to the gesture-triggered instruction are mutually exclusive with each other performing a corresponding processing in priority order according to a preset priority or determining whether the touch operation instruction is a special case based on a preset priority, and if it is determined to be a special case, readjusting the priority order;
   wherein the preset priority is set for performing the stylus operation corresponding to the stylus-triggered instruction first, and then performing the gesture operation corresponding to the gesture-triggered instruction.

2. The method for identifying a trajectory on a touch screen of claim 1, wherein, detecting a touch operation instruction triggered on the touch screen comprises:
   in an ink state, acquiring a trigger mode returned by the touch screen;
   automatically matching the trigger mode with an input source and determining a corresponding touch operation instruction.

3. The method for identifying a trajectory on a touch screen of claim 2, wherein, automatically matching the trigger mode with an input source and determining a corresponding touch operation instruction comprises:
   automatically matching the trigger mode with an encapsulated api corresponding to an input source and determining a touch operation instruction corresponding to the encapsulated api.

4. The method for identifying a trajectory on a touch screen of claim 1, wherein, performing a corresponding processing according to an acquired trajectory of the gesture comprises:
   performing a corresponding processing of gesture according to an acquired trajectory of the gesture of a single-finger operation or a multi-finger operation;
   wherein, the processing of gesture includes: zooming an interface, and/or scrolling an interface, and/or selecting text content, and/or filling an area swept by a gesture, and/or cutting/copying an area swept by a gesture;
   wherein, performing a corresponding processing according to an acquired trajectory of the stylus comprises;
   performing a corresponding processing of stylus according to an acquired trajectory of the stylus;
   wherein, the processing of stylus includes: an ink drawing processing, and/or a laser stylus processing, and/or a regular image/object drawing processing, and/or an eraser processing.

5. An electronic device, comprising:
   a processor, a memory, communication interfaces and a communication bus; wherein
   the processor, the memory, and the communication interfaces are connected and communicate with each other via the communication bus;
   the memory stores executable program codes;
   the processor executes a program corresponding to the executable program codes by reading the executable program codes stored in the memory to implement the method for identifying a trajectory on a touch screen of claim 1.

6. A non-temporary computer-readable storage medium, configured for storing executable program codes; wherein, the executable program codes are configured for, when being executed, implementing the method for identifying a trajectory on a touch screen of claim 1.

* * * * *